United States Patent
Borkholder

(10) Patent No.: US 10,343,470 B2
(45) Date of Patent: Jul. 9, 2019

(54) GOOSENECK COUPLER

(71) Applicant: Carl J. Borkholder, Bremen, IN (US)

(72) Inventor: Carl J. Borkholder, Bremen, IN (US)

(*) Notice: Subject to any disclaimer, the term of this patent is extended or adjusted under 35 U.S.C. 154(b) by 134 days.

(21) Appl. No.: 15/661,758

(22) Filed: Jul. 27, 2017

(65) Prior Publication Data

US 2019/0030969 A1 Jan. 31, 2019

(51) Int. Cl.
*B60D 1/24* (2006.01)
*B60D 1/50* (2006.01)

(52) U.S. Cl.
CPC .............. *B60D 1/248* (2013.01); *B60D 1/50* (2013.01)

(58) Field of Classification Search
CPC .................................. B60D 1/50; B60D 1/248
USPC ......................................................... 280/489
See application file for complete search history.

(56) References Cited

U.S. PATENT DOCUMENTS

| 3,550,865 | A | * | 12/1970 | Mackinnon | ............ | A01C 17/00 |
| | | | | | | 222/202 |
| 4,077,650 | A | | 3/1978 | Leach, Jr. | | |
| 4,641,852 | A | * | 2/1987 | Kerst | ................... | B60D 1/50 |
| | | | | | | 280/489 |
| 7,775,544 | B2 | * | 8/2010 | Bouwkamp | ............ | B60D 1/143 |
| | | | | | | 280/483 |
| 9,505,281 | B1 | * | 11/2016 | Borkholder | ............ | B60D 1/248 |
| 9,802,452 | B1 | * | 10/2017 | McCall | .................. | B60D 1/249 |
| 2003/0178811 | A1 | * | 9/2003 | Buckner | .................. | B60D 1/50 |
| | | | | | | 280/483 |
| 2003/0214116 | A1 | | 11/2003 | Rehme | | |

* cited by examiner

*Primary Examiner* — Joseph M Rocca
*Assistant Examiner* — Felicia L. Brittman
(74) *Attorney, Agent, or Firm* — Botkin & Hall, LLP

(57) ABSTRACT

A gooseneck hitch adapter has an upper assembly that is designed to affix to an existing trailer. The upper assembly has an upper and a lower torsion tube that each has corresponding torsion bars. The torsion bars extend outwardly where each affixes to a corresponding torsion arm. The hitch adapter has a lower assembly that is designed to affix to a towing vehicle. The lower assembly has an upper and a lower torsion tube that each has corresponding torsion bars. The upper torsion arm affixes the upper torsion bar of the upper assembly to the upper torsion bar of the lower assembly. Correspondingly, a lower torsion arm affixes the lower torsion bars of the upper assembly to the lower assembly. The torsion tubes and bars resist rotation and cooperate to allow limited movement and provide resistance to forces along the axes of the upper and lower assemblies.

17 Claims, 8 Drawing Sheets

GOOSENECK COUPLER

BACKGROUND OF THE INVENTION

This present disclosure relates to gooseneck hitch adapters and the attachment between a gooseneck trailer and a towing vehicle. Commonly, when being towed by a vehicle, the trailer is subject to transient forces as the towing vehicle pulls the trailer over various terrain or when loads are moved or placed on the trailer. Trailers have a tongue weight that is borne by the towing vehicle. With a gooseneck trailer, a significant amount of tongue weight is carried by the towing vehicle. Transient forces on the trailer can translate to transient tongue forces transmitted to the towing vehicle, at the very least, can be unsettling to the driver. In an extreme situation, the transient tongue forces can create a dangerous loss of control. An improved gooseneck adapter that can be located between the trailer and the towing vehicle is necessary.

SUMMARY OF THE INVENTION

The present disclosure describes a torsion gooseneck coupler that will attach to a towing vehicle and absorb transient tongue loading either caused by the towing vehicle or the trailer. The device has an upper torsion assembly and a lower torsion assembly. The upper torsion assembly has two torsion tubes with corresponding torsion bars. The lower torsion assembly has two torsion tubes with corresponding torsion bars. The torsion bars resist rotation with respect to the torsion tubes. The torsion assemblies are coupled through torsion arms which are affixed to the ends of their respective torsion bars. The torsion bars and arms resist movement along the axes of the upper and lower torsion assembly and allow for limited relative vertical motion between the towing vehicle and the trailer. An optional load indicator affixed to the device provides a visual indicator of the vertical displacement between the upper and lower torsion assembly. The device further provides an offset for vehicles that have a short bed that desire the clearance of a longer bed vehicle.

BRIEF DESCRIPTION OF THE DRAWINGS

A preferred embodiment of this invention has been chosen wherein.

DESCRIPTION OF THE PREFERRED EMBODIMENT

Figure 1:
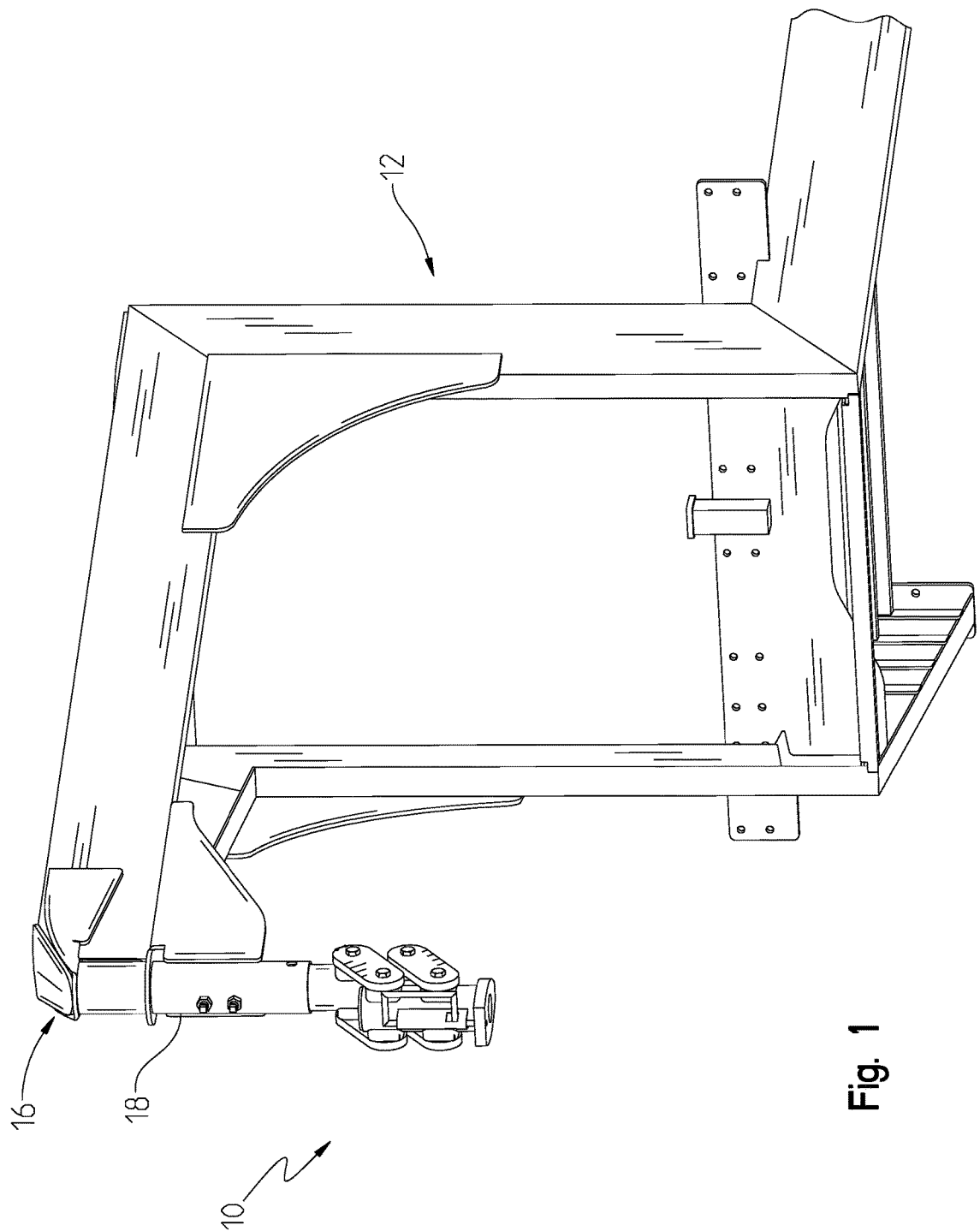
FIG. 1 is an isometric view of a gooseneck trailer with the coupler attached.
Figure 2:
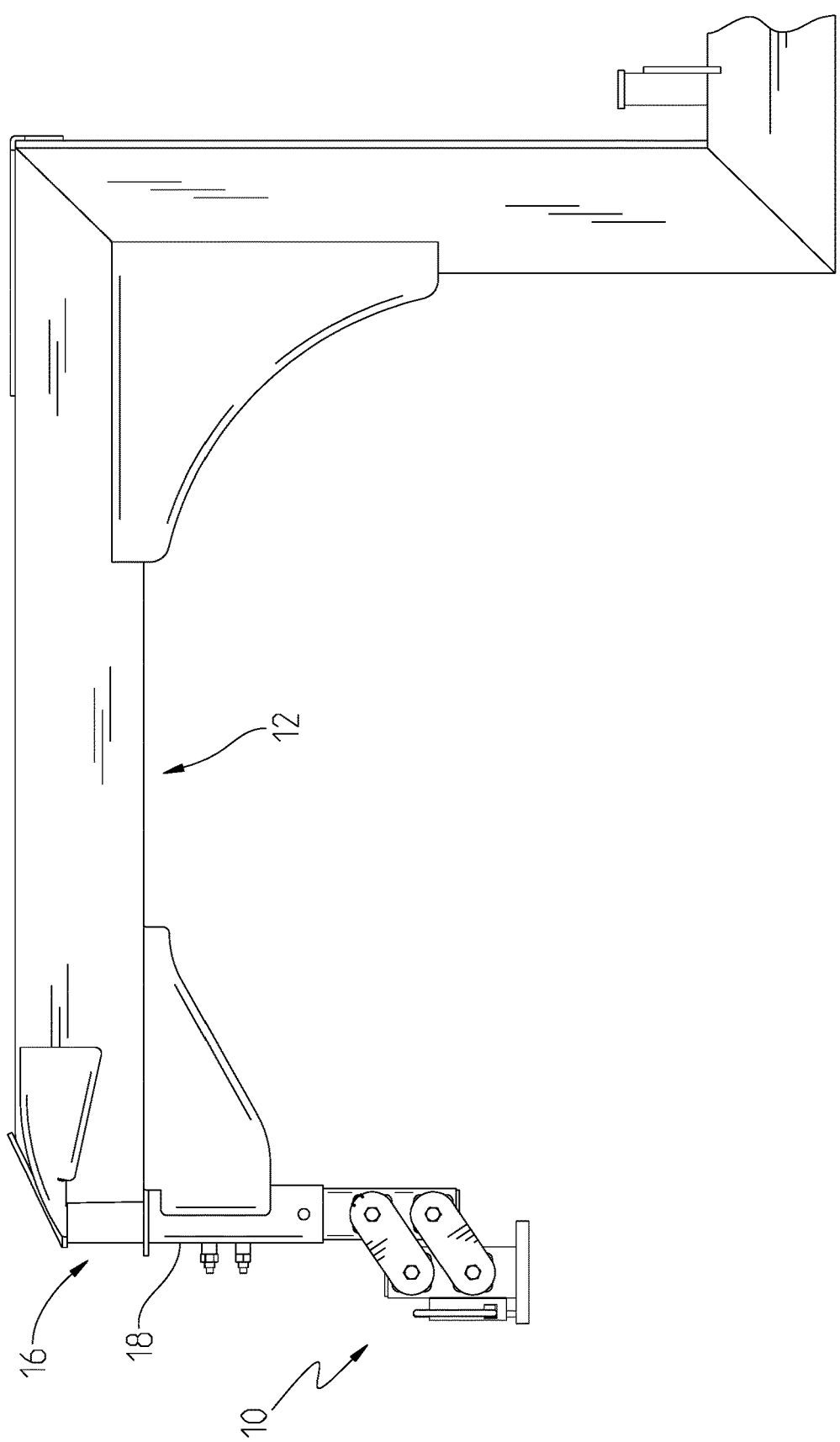
FIG. 2 is a left side view of the trailer as shown in FIG. 1.

As shown in FIG. 1, a trailer 12 uses a coupler 10 to affix the trailer 12 to a towing vehicle (not shown). Gooseneck trailers attached to towing vehicles are well-known in the art. The trailer 12 has a gooseneck end 16 with a tubular end 18. The tubular end 18 receives the coupler 10 where it is affixed to the trailer 12. The coupler 10 affixes to the towing vehicle using a ball and socket, where the ball is affixed to the vehicle, commonly above the rear axle. The coupler is affixed to the ball but allows some pivoting of the vehicle with respect to the trailer 12, as is well-known in the art. The coupler 10 carries the tongue weight of the trailer 12 and maintains the connection between the trailer 12 and the vehicle.

Figure 3:
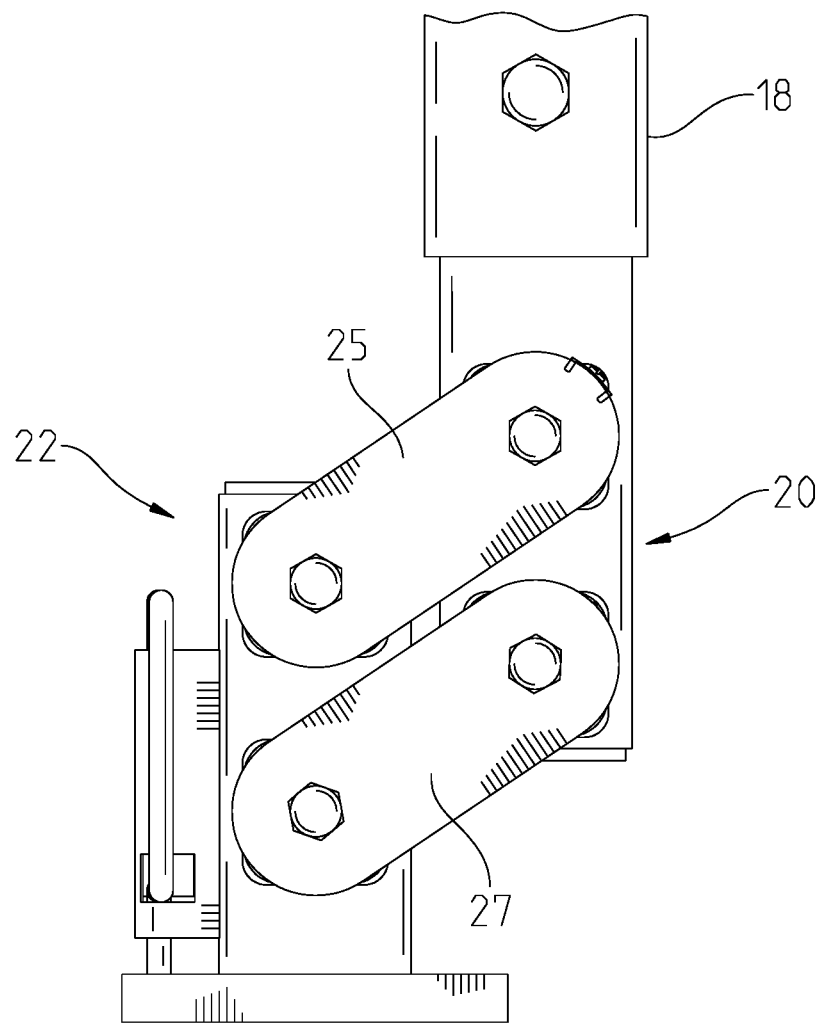
FIG. 3 is a left side view of the coupler.
Figure 4:
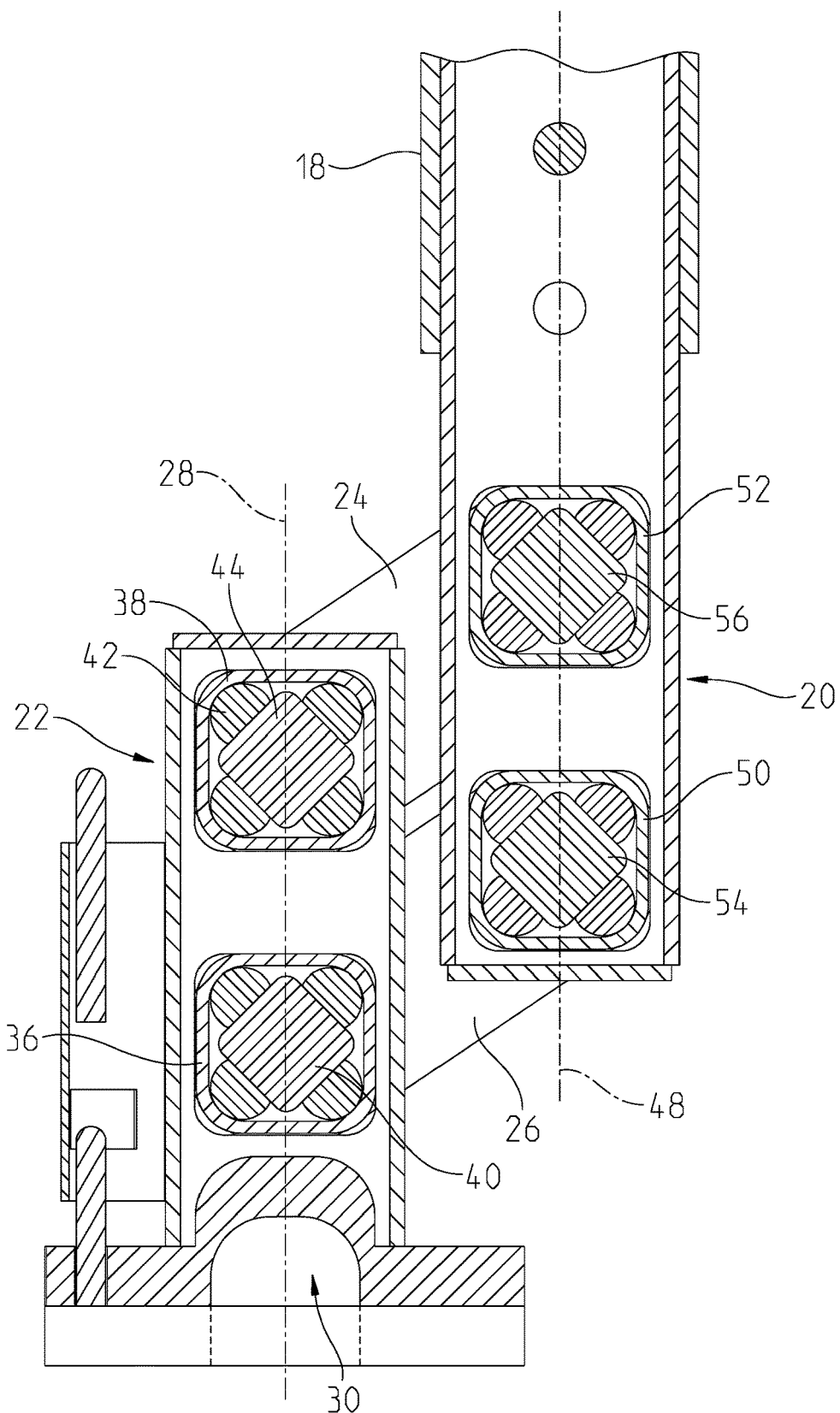
FIG. 4 is a left side section view of the coupler.
Figure 5:
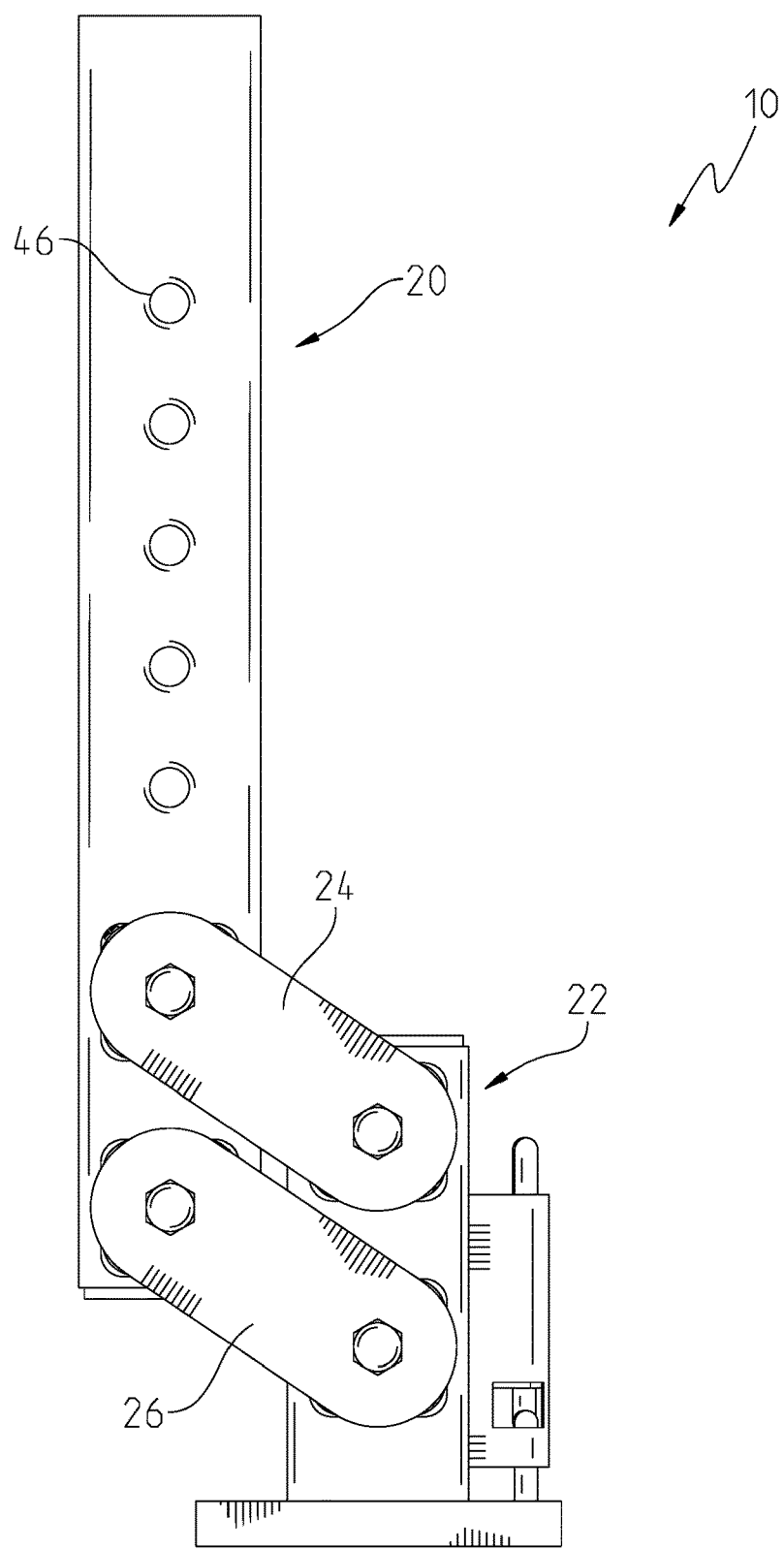
FIG. 5 is a right side view of the coupler.
Figure 6:
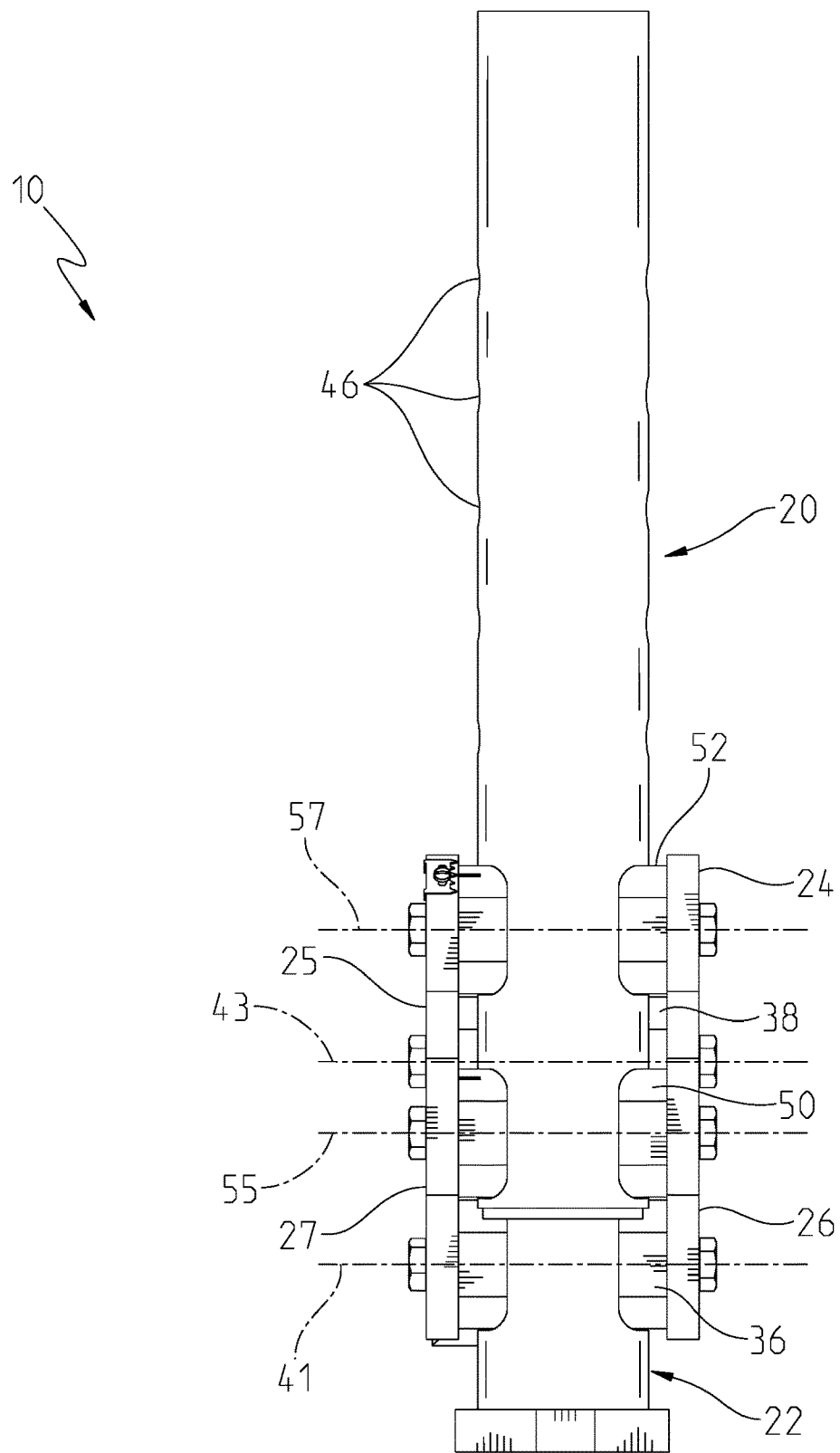
FIG. 6 is a rear view of the coupler.

The coupler 10, shown in FIGS. 3-5, has an upper portion 20 and a lower portion 22 that are coupled through arms 24, 26 on one side and 25, 27 on the opposite side. The lower portion 22 has a central axis 28 that extends along its length. At one end of the lower portion is the ball pocket 30 and a locking plate 32 which are used to mate the coupler 10 to a vehicle-mounted ball. As shown, the lower portion 22 is cylindrical but it is contemplated that a square, rectangular, beam, or other shape is used. A first torsion tube 36 is affixed to the lower portion 22 and extends through the center. A second torsion tube 38 is also affixed to the lower portion 22 and also extends through the center. The first torsion tube 36 and second torsion tube 38 are parallel. Located inside the first torsion tube 36 is a first torsion bar 40. The first torsion bar 40 is restrained in the first torsion tube 36 using resilient cords 42. The second torsion tube 38 has a corresponding second torsion bar 44. The torsion tubes and bars are shown in section view FIG. 4. The first torsion bar 40 rotates about a first axis 41 and the second torsion bar 44 rotates about a second axis 43. The axes 41, 43 are parallel. These axes are shown in FIG. 6. The axes 41, 43 intersect the central axis 28 but it is contemplated that they are offset therefrom.

Figure 8:
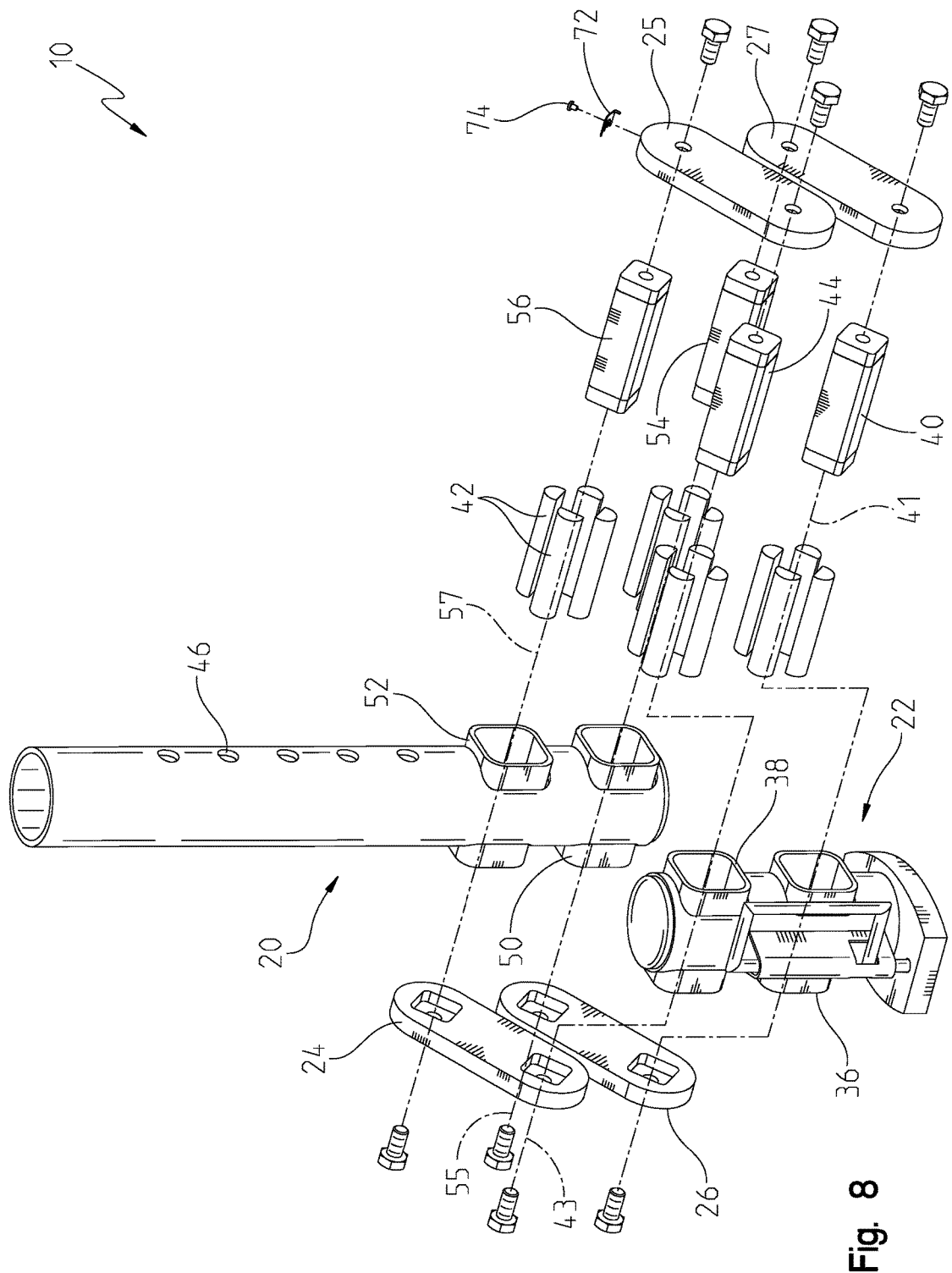
FIG. 8 is an exploded isometric view of the coupler.

The upper portion 20 has a central axis 48 that extends along its length and is parallel to the central axis 28 of the lower portion 22. At the upper end is a series of holes 46 where the tubular end 18 of the trailer 12 is affixed. The upper portion 20 is shown as a cylindrical tube but other shapes, such as square, are contemplated. It is further contemplated that the upper portion 20 and lower portion 22 are solid members or beams. A third torsion tube 50 is affixed to the upper portion 20 and extends through the center. Located above the third torsion tube 50 is a fourth torsion tube 52 that is also affixed to the upper portion 20. The third and fourth torsion tubes 50, 52 are parallel. The third torsion tube 50 carries a third torsion bar 54 and the fourth torsion tube 52 carries a fourth torsion bar 56. As with the first and second torsion tubes 36, 38, resilient cords 42 surround the torsion bars 54, 56 and restrain the rotation of their corresponding torsion bar. The resilient cords 42 compress the torsion bars and restrict the rotation of the torsion bar 40, 44, 54, 56 with respect to the corresponding torsion tube 36, 38, 50, 52. Resilient cords 42 being used with torsion bars and tubes are well-known in the art. The third torsion bar 54 rotates about a third axis 55 and the fourth torsion bar 56 rotates about a fourth axis 57. The axes 55, 57 are parallel. As shown, the axes 55, 57 intersect the central axis 48 but it is contemplated that they are offset therefrom. The section view in FIG. 4 and exploded diagram in FIG. 8 shows the relationship of the resilient cords 42, torsion bars 40, 44, 54, and 56, torsion tubes 36, 38, 50, and 52, arms 24, 25, 26, and 27.

Torsion arms 24, 25 are connected on one end to the fourth torsion bar 56 and the opposite end is connected to the second torsion bar 44. Correspondingly, torsion arms 26, 27 are connected on one end to the first torsion bar 40 and the opposite end is connected to the third torsion bar 54. The torsion arms 24, 25, 26, 27 are equal in length. The torsion arms are securely affixed to the torsion bars using bolts, screws, welding, pressing, or another method common in the art but not specifically described herein. The spacing of the first, second, third, and fourth axes and equal length of the torsion arms allow axial movement of the upper portion 20 with respect to the lower portion 22. Because each torsion bar resists rotation with respect to its corresponding torsion tube, the coupler 10 is constantly urged toward an unloaded position. As downward force is exerted on the coupler 10 through central axis 48 by the trailer 12, the torsion arms 24, 25, 26, 27 begin to rotate simultaneously with the torsion bars 40, 44, 54, and 56. The central axis 28 will begin to move away from central axis 48 as the torsion arms rotate to a more horizontal position. The greater the axial force on the coupler 10, the more horizontal the arms become. The FIGS. show the coupler 10 in an unloaded position.

Figure 7:
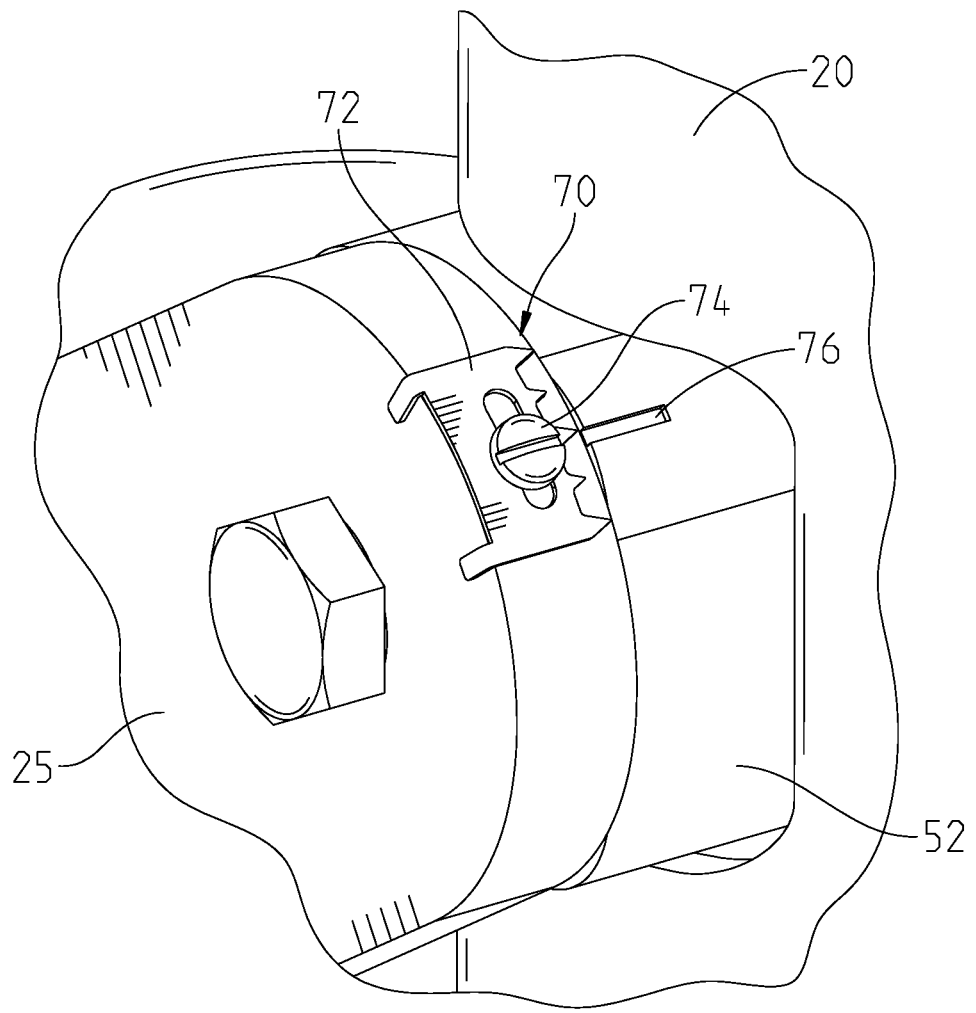
FIG. 7 is an isometric partial view of the load indicator portion of the coupler.

An optional load indicator 70, shown in FIG. 7, is affixed to one of the torsion arms 24, 25, 26, 27. The load indicator 70 has a moving portion 72 that is affixed to the arm with a fastener 74. The moving portion 72 is adjustable by loosening the fastener 74 and sliding the moving portion to the desired position. The adjacent torsion tube 36, 38, 50, 52 includes a reference line 76 for the user to reference and measure the amount rotation of the torsion arms and therefore the amount of axial displacement between the upper portion 20 and the lower portion 22. As installed, the central axis 48 is located rearward compared to central axis 28. This provides an offset rearward to the trailer 12.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A torsion gooseneck coupler adapted to be affixed between a towing vehicle and a trailer, said towing vehicle having a vehicle-mounted ball, said torsion gooseneck coupler comprising:
   a lower assembly having an elongate tubular member having a centrally located lower axis, said lower assembly adapted to receive said vehicle-mounted ball, said lower assembly having a first torsion tube affixed to said elongate tubular member of said lower assembly with a centrally located first central axis and a second torsion tube affixed to said lower assembly with a centrally located second central axis, said first and second central axes each orthogonally intersecting said lower axis, said first and second central axes being parallel, said first torsion tube having a first torsion bar held therein and resisting rotation with respect to said first torsion tube, said second torsion tube having a second torsion bar held therein and resisting rotation with respect to said second torsion tube;
   an upper assembly having an elongate tubular member having a centrally located upper axis, said upper assembly adapted to be affixed to said trailer, said upper assembly having a third torsion tube affixed to said elongate tubular member of said upper assembly with a centrally located third central axis and a fourth torsion tube affixed to said elongate member of said upper assembly with a centrally located fourth central axis, said third and fourth central axes each orthogonally intersecting said upper axis, said third and fourth central axes being parallel, said third torsion tube having a third torsion bar held therein and resisting rotation with respect to said third torsion tube, said fourth torsion tube having a fourth torsion bar held therein and resisting rotation with respect to said fourth torsion tube;
   a lower torsion arm affixed to a terminal end of said first torsion bar and affixed to a terminal end of said third torsion bar, an upper torsion arm affixed to a terminal end of said second torsion bar and affixed to a terminal end of said fourth torsion bar;
   said upper and lower torsion arms rotatable between an unloaded position and a loaded position, said torsion arms being biased toward said unloaded position, said upper and lower torsion arms remaining parallel between said loaded and said unloaded positions, said lower and said upper axes remaining parallel.

2. The torsion gooseneck coupler of claim 1, wherein said lower assembly and said upper assembly have a circular cross section.

3. The torsion gooseneck coupler of claim 1, wherein said lower assembly and said upper assembly have a square cross section.

4. The torsion gooseneck coupler of claim 1, further comprising a load indicator to indicate the amount of force applied by said trailer along said lower axis.

5. The torsion gooseneck coupler of claim 1, further comprising a load indicator to indicate the position of said torsion arms between said loaded and said unloaded positions.

6. A torsion gooseneck coupler adapted to be affixed between a towing vehicle and a trailer, said towing vehicle having a vehicle-mounted ball, said torsion gooseneck coupler comprising:
   a lower assembly having an elongate member having a lower axis, said lower assembly adapted to receive said vehicle-mounted ball, said lower assembly having a first torsion tube affixed to said elongate member of said lower assembly with a first central axis and a second torsion tube affixed to said elongate member of said lower assembly with a second central axis, said first and second central axes being parallel, said first torsion tube having a first torsion bar held therein and resisting rotation with respect to said first torsion tube, said second torsion tube having a second torsion bar held therein and resisting rotation with respect to said second torsion tube;
   an upper assembly having an elongate member having an upper axis, said upper assembly adapted to be affixed to said trailer, said upper assembly having a third torsion tube affixed to said elongate member of said upper assembly with a third central axis and a fourth torsion tube affixed to said elongate member of said upper assembly with a fourth central axis, said third and fourth central axes being parallel, said third torsion tube having a third torsion bar held therein and resisting rotation with respect to said third torsion tube, said fourth torsion tube having a fourth torsion bar held therein and resisting rotation with respect to said fourth torsion tube;
   a lower torsion arm connected to terminal ends of said first torsion bar and said third torsion bar, an upper torsion arm connected to terminal ends of said second torsion bar and said fourth torsion bar;
   said upper and lower torsion arms rotatable between an unloaded position and a loaded position, said torsion arms being biased toward said unloaded position, said upper and lower torsion arms remaining parallel between said loaded and said unloaded positions.

7. The torsion gooseneck coupler of claim 6, wherein said first and second central axes each intersect said lower axis and said third and fourth central axes each intersect said upper axis.

8. The torsion gooseneck coupler of claim 6, wherein said lower assembly and said upper assembly have a circular cross section.

9. The torsion gooseneck coupler of claim 6, wherein said lower assembly and said upper assembly have a square cross section.

10. The torsion gooseneck coupler of claim 6, further comprising a load indicator to indicate the amount of force applied by said trailer along said lower axis.

11. The torsion gooseneck coupler of claim 6, further comprising a load indicator to indicate the position of said torsion arms between said loaded and said unloaded positions.

12. The torsion gooseneck coupler of claim 6, wherein said first and second axes each orthogonally intersect said lower axis, said third and fourth central axes each orthogonally intersect said upper axis.

13. The torsion gooseneck coupler of claim 6, wherein said upper axis and said lower axis remain parallel.

14. A torsion gooseneck coupler adapted to be affixed between a towing vehicle and a trailer, said towing vehicle having a vehicle-mounted ball, said torsion gooseneck coupler comprising:
   a lower assembly having an elongate member having a lower axis, said lower assembly adapted to receive said vehicle-mounted ball, said lower assembly having a first torsion tube affixed to said elongate member of said lower assembly with a first central axis, said first torsion tube having a first torsion bar held therein and resisting rotation with respect to said first torsion tube;
   an upper assembly having an elongate member having an upper axis, said upper assembly adapted to be affixed to said trailer, said upper assembly having a third torsion tube affixed to said elongate member of said upper assembly with a third central axis, said third torsion tube having a third torsion bar held therein and resisting rotation with respect to said third torsion tube;
   a torsion arm connected to terminal ends of said first torsion bar and said third torsion bar, said torsion arm rotatable between an unloaded position and a loaded position, said torsion arm being biased toward said unloaded position.

15. The torsion gooseneck coupler of claim 14, further comprising a second torsion tube affixed to said lower assembly and having a second central axis, said second central axis parallel to said first central axis, said second torsion tube having a second torsion bar held therein and resisting rotation with respect to said second torsion tube.

16. The torsion gooseneck coupler of claim 15, further comprising a fourth torsion tube affixed to said upper assembly and having a fourth central axis, said fourth central axis parallel to said second central axis, said fourth torsion tube having a fourth torsion bar held therein and resisting rotation with respect to said fourth torsion tube.

17. The torsion gooseneck coupler of claim 16, further comprising an upper torsion arm connected to terminal ends of said second and said fourth torsion bar, said upper and lower torsion arms remaining parallel between said loaded and said unloaded positions.

* * * * *